US012013656B2

(12) United States Patent
Han

(10) Patent No.: US 12,013,656 B2
(45) Date of Patent: Jun. 18, 2024

(54) DETECTING SIZE OF PRINT MEDIUM USING SENSORS AVAILABLE ALONG PAPER PATH

(71) Applicant: HEWLETT-PACKARD DEVELOPMENT COMPANY, L.P., Spring, TX (US)

(72) Inventor: JaeHee Han, Suwon-Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 39 days.

(21) Appl. No.: 17/040,918

(22) PCT Filed: Mar. 22, 2019

(86) PCT No.: PCT/US2019/023658
§ 371 (c)(1),
(2) Date: Sep. 23, 2020

(87) PCT Pub. No.: WO2019/190926
PCT Pub. Date: Oct. 3, 2019

(65) Prior Publication Data

US 2021/0034005 A1 Feb. 4, 2021

(30) Foreign Application Priority Data

Mar. 26, 2018 (KR) ........................ 10-2018-0034769

(51) Int. Cl.

| | |
|---|---|
| ***G03G 15/00*** | (2006.01) |
| ***B65H 7/12*** | (2006.01) |
| ***B65H 7/20*** | (2006.01) |

(52) U.S. Cl.
CPC ............... *G03G 15/70* (2013.01); *B65H 7/12* (2013.01); *B65H 7/20* (2013.01); *B65H 2601/10* (2013.01)

(58) Field of Classification Search
CPC . G03G 15/70; B65H 7/12; B65H 7/20; B65H 2601/10
See application file for complete search history.

(56) References Cited

U.S. PATENT DOCUMENTS

| | | | |
|---|---|---|---|
| 6,471,429 | B1 | 10/2002 | Isobe |
| 8,670,682 | B2 | 3/2014 | Lee |
| 9,522,553 | B2 | 12/2016 | Shinagawa |
| 2004/0057744 | A1 | 3/2004 | Kawagoe |
| 2007/0002089 | A1 | 1/2007 | Kobayashi et al. |

(Continued)

FOREIGN PATENT DOCUMENTS

| | | | |
|---|---|---|---|
| EP | 1336508 | B1 | 10/2007 |
| JP | 19930105265 | | 4/1993 |

(Continued)

*Primary Examiner* — David H Banh
(74) *Attorney, Agent, or Firm* — Foley & Lardner LLP

(57) ABSTRACT

An image forming apparatus includes a load detection sensor located on a feeder to detect whether a print medium is loaded on the feeder, an overload detection sensor to detect an overload state of a discharger, and a controller to detect a width of the print medium according to a combination of a feeder load state of a feeder load detection signal of the load detection sensor and an overload state of a discharger overload detection signal of the overload detection sensor and control an image former to perform printing by applying different print modes according to the detected width of the print medium.

15 Claims, 4 Drawing Sheets

(56) References Cited

U.S. PATENT DOCUMENTS

| | | | | |
|---|---|---|---|---|
| 2011/0064439 | A1 | 3/2011 | Suzuki | |
| 2014/0125007 | A1* | 5/2014 | Sakano | B65H 7/20 271/265.01 |
| 2014/0369730 | A1* | 12/2014 | Bayerle | G03G 21/1685 399/330 |
| 2015/0063857 | A1* | 3/2015 | Battat | G03G 15/2021 399/329 |
| 2015/0183605 | A1* | 7/2015 | Kato | B65H 31/3027 271/227 |
| 2015/0239687 | A1* | 8/2015 | Shinkawa | B65H 7/20 271/171 |
| 2015/0273900 | A1* | 10/2015 | Shinagawa | B41J 13/0054 347/16 |
| 2017/0192378 | A1* | 7/2017 | Hashiguchi | G03G 15/2042 |
| 2021/0011409 | A1* | 1/2021 | Sakamoto | G03G 15/50 |
| 2021/0211550 | A1* | 7/2021 | Sato | H04N 1/00644 |

FOREIGN PATENT DOCUMENTS

| | | | |
|---|---|---|---|
| JP | 19950129027 | | 5/1995 |
| JP | 20010002279 | | 1/2001 |
| JP | 2001072304 | A | 3/2001 |
| JP | 2005263402 | | 9/2005 |
| JP | 2008122934 | A | 5/2008 |

* cited by examiner

DETECTING SIZE OF PRINT MEDIUM USING SENSORS AVAILABLE ALONG PAPER PATH

CROSS REFERENCE TO RELATED APPLICATIONS

This application is filed under 35 U.S.C. § 371 as a National Stage of PCT International Application No. PCT/US2019/023658, filed on Mar. 22, 2019, in the U.S. Patent and Trademark Office, which claims the priority benefit of Korean Patent Application No. 10-2018-0034769, filed on Mar. 26, 2018, in the Korean Intellectual Property Office. The disclosures of PCT International Application No. PCT/US2019/023658 and Korean Patent Application No. 10-2018-0034769 are incorporated by reference herein in their entireties.

BACKGROUND

An electrophotographic image forming apparatus forms a visible toner image on a photoconductor by supplying toner to an electrostatic latent image formed on the photoconductor, transfers the toner image to a print medium, fixes the transferred toner image on the print medium, and prints an image on the print medium.

A fusing unit may include a heating member and a pressing member that are engaged with each other to form a fixing nip. The print medium is subjected to heat and pressure as the print medium passes the fixing nip. Accordingly, the toner image is fixed onto the print medium.

DETAILED DESCRIPTION

A width of a heating member corresponds to a width of a print medium having a maximum available size. The entire width of the heating member is heated during a printing process.

When a print medium having a small width passes the fixing nip, since heat of a portion of the heating member where the print medium does not pass is not transmitted to the print medium, a temperature of the portion where the print medium does not pass may be higher than that of a portion passed by the print medium. When the print medium having the small width is continuously printed, a temperature of the portion where the print medium does not pass may be much higher than that of the portion passed by the print medium.

Figure 1:
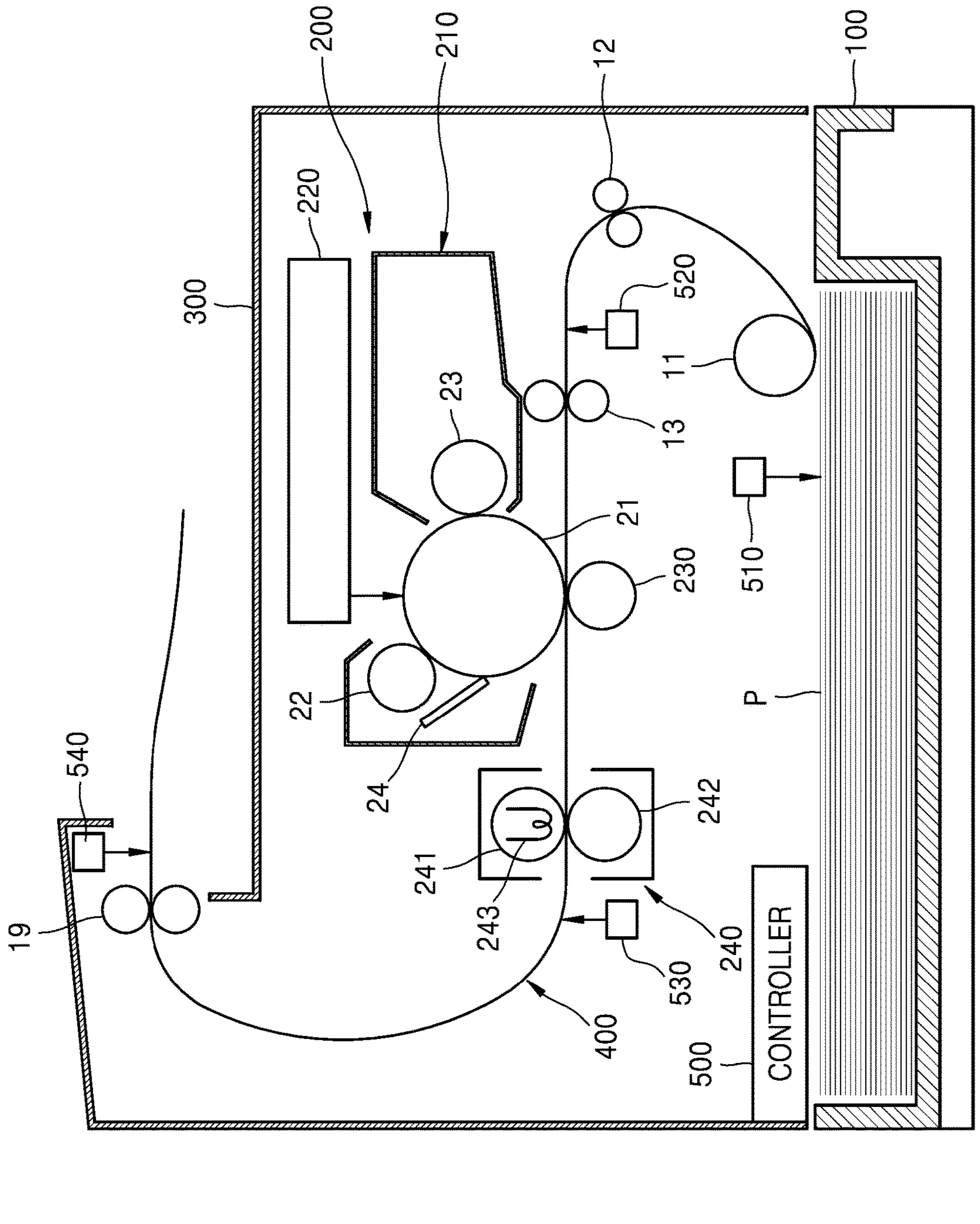
FIG. 1 is a view illustrating a configuration of an electrophotographic image forming apparatus according to an example.

FIG. 1 is a view illustrating a configuration of an electrophotographic image forming apparatus according to an example. Referring to FIG. 1, a feeder 100 on which a print medium P is loaded, and a discharger 300 on which the print medium P that has been completely printed is loaded are illustrated. A print path 400 connects the feeder 100 and the discharger 300. An image former 200 is located in the print path 400.

The print medium P loaded on the feeder 100 is taken out one by one, and is conveyed along the print path 400. Although the feeder 100 is a feed cassette in the present example, the feeder 100 is not limited thereto. For example, the feeder 100 may be a multi-purpose feed tray.

Figure 2:
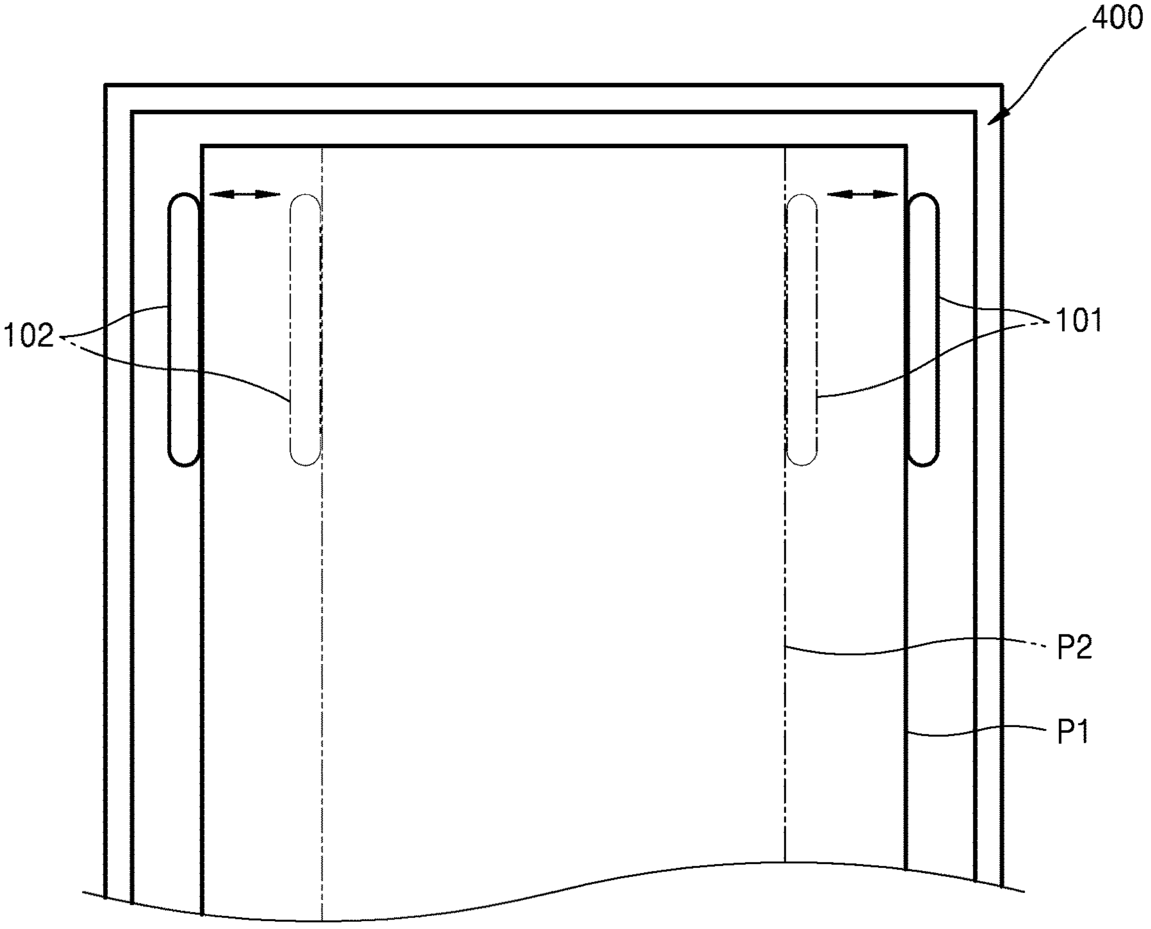
FIG. 2 is a plan view of a feeder.

FIG. 2 is a plan view of the feeder 100. Referring to FIG. 2, the print medium P may be loaded in a center alignment method on the feeder 100. The feeder 100 may include one pair of guide members 101 and 102. The one pair of guide members 101 and 102 guide both end portions of the print medium P in a width direction of the print medium P so that the print medium P is loaded in the center alignment method on the feeder 100. In order to adjust an interval between the one pair of guide members 101 and 102 to correspond to a width of the print medium P, the one pair of guide members 101 and 102 may be moved toward/away from each other. The one pair of guide members 101 and 102 may be synchronized and may be moved toward/away from each other. In order to load a print medium P1 having a large width, the one pair of guide members 101 and 102 may be located as indicated by a solid line of FIG. 2, and in order to load a print medium P2 having a small width, the one pair of guide members 101 and 102 may be located as indicated by a dashed line of FIG. 2.

The image former 200 forms an image by using an electrophotographic method on the print medium P that is conveyed along the print path 400. The image former 200 may include a developing unit 210, an exposure unit 220, a transfer roller 230, and a fusing unit 240. The developing unit 210 supplies toner contained in the developing unit 210 to an electrostatic latent image formed on a photosensitive drum 21 and develops the electrostatic latent image into a visible toner image.

The photosensitive drum 21 that is a photoconductor on a surface of which the electrostatic latent image is formed may include a conductive metal pipe and a photosensitive layer formed on an outer circumferential surface of the conductive metal pipe. A charging roller 22 charges a surface of the photosensitive drum 21 to a uniform potential.

The exposure unit 220 emits light modulated to correspond to image formation to the photosensitive drum 21 and forms the electrostatic latent image on the photosensitive drum 21. A laser scanning unit (LSU) using a laser diode as a light source or a light-emitting diode (LED) exposure unit using an LED as a light source may be used as the exposure unit 220.

A developing roller 23 supplies a developer, e.g., the toner, contained in the developing unit 210 to the photosensitive drum 21 and develops the electrostatic latent image into the visible toner image. A development bias voltage may be applied to the developing roller 23. When a one-component development method is used, the toner may be contained in the developing unit 210. When a two-component development method is used, the toner, or the toner and a carrier may be contained in the developing unit 210. Although not shown, the developing unit 210 may further include a supply roller configured to supply the developer contained in the developing unit 210 to the developing roller 23, a regulation member configured to regulate the amount of the developer attached to a surface of the developing roller 23 and supplied to a development area where the photosensitive drum 21 and the developing roller 23 face each other, and an agitator configured to agitate the developer contained in the developing unit 210.

The transfer roller 230 is a transfer unit configured to transfer the toner image from the photosensitive drum 21 to the print medium P. A transfer bias voltage for transferring the toner image to the print medium P is applied to the transfer roller 230. A coroner transfer unit or a transfer unit using a pin scorotron method may be used, instead of the transfer roller 230.

The print medium P is picked up one by one from the feeder 100 by a pickup roller 11, and is conveyed to an area where the photosensitive drum 21 and the transfer roller 230 face each other by conveying rollers 12 and 13.

The fusing unit 240 fixes the toner image transferred to the print medium P onto the print medium P by applying heat and pressure to the toner image. The print medium P passing through the fusing unit 240 is discharged to and loaded on the discharger 300 by a discharging roller 19.

A cleaning blade 24 is a cleaning unit for removing the toner and a foreign material remaining on the surface of the photosensitive drum 21 after a transfer process. Another type of cleaning device such as a rotating brush may be used, instead of the cleaning blade 24.

In the above configuration, the exposure unit 220 forms the electrostatic latent image by scanning light modulated to correspond to the image information to the photosensitive drum 21. The developing roller 23 forms the visible toner image on the surface of the photosensitive drum 21 by supplying the toner to the electrostatic latent image. The print medium P loaded on the feeder 100 is conveyed to the area where the photosensitive drum 21 and the transfer roller 230 face each other by the pickup roller 11 and the conveying rollers 12 and 13, and the toner image is transferred to the print medium P from the photosensitive drum 21 due to the transfer bias voltage applied to the transfer roller 230. When the print medium P passes through the fusing unit 240, the toner image is fixed onto the print medium P due to heat and pressure. The print medium P that has been completely fixed is discharged by the discharging roller 19 and is loaded on the discharger 300.

The fusing unit 240 may include a heating member 241 and a pressing member 242 that are engaged with each other and form a fixing nip through which the print medium P passes. The heating member 241 may be heated by a heat source 243. The heating member 241 may be, for example, a metal roller or an endless belt. The heat source 243 may be, for example, a halogen lamp or a ceramic heater. A width of the heating member 241 may correspond to a width of the print medium P. While the print medium P passes through the fixing nip, heat of the heating member 241 is transmitted to the print medium P and the toner image. While printing is performed, the entire width of the heating member 241 is heated. When the print medium P2 having a small width passes through the fixing nip, a surface of the heating member 241 is divided into a contact portion contacting the print medium P2 and a non-contact portion not contacting the print medium P2 in a width direction. Since heat of the non-contact portion of the heating member 241 is not transmitted, a temperature of the non-contact portion may be higher than a temperature of the contact portion. When a plurality of pieces of paper are continuously printed as the print medium P2 having a small width, a temperature of the non-contact area may be much higher than that of the contact portion. A temperature increase of the heating member 241 may adversely affect a lifetime of the fusing unit 240. Also, heat may be transmitted to other members in the image forming apparatus, and may adversely affect a lifetime of the image forming apparatus.

In this regard, the controller 500 may control the image former 200 to print an image in one mode selected from different print modes, for example, a first mode and a second mode, according to a width of the print medium P. The controller 500 may stop the printing and may output a print error signal according to a feeding state of the print medium P. The first mode that is a normal print mode is applied to the print medium P1 having a maximum size that may be loaded on the feeder 100. The second mode that is a low-speed print mode is applied to the print medium P2 having a width less than that of the print medium P1. For example, the print medium P1 may be an A4 or LTR sheet, and the print medium P2 may be an A5 or B5 sheet. When the print medium P2 having a small width is used, a cooling time of the non-contact portion may be secured by reducing a print speed, thereby reducing the risk of overheating of the non-contact portion.

For example, the controller 500 may control the image former 200 to print an image at a first process speed in the first mode, and may control the image former 200 to print an image at a second process speed, which is less than the first process speed, in the second mode. The process speed that is a speed at which the image former 200 forms an image refers to a linear speed of the photosensitive drum 21 or a feed speed of the print medium P.

For example, during continuous printing, the controller 500 may set an interval between a previous printing operation and a next printing operation as a first interval in the first mode, and a second interval, which is greater than the first interval, in the second mode. In this case, the first process speed and the second process speed may be the same, or the second process speed may be less than the first process speed.

In order to distinguish the first mode from the second mode, a width of the print medium P needs to be detected. The controller 500 detects the width of the print medium P by combining detection signals of two sensors (a first sensor and a second sensor) for detecting the print medium P in an image forming process, and controls the image former 200 to perform printing in one mode selected from among the first mode and the second mode whose print speed is less than that of the first mode according to the detected width of the print medium P. The controller 500 may detect a feeding state of the print medium P by combining detection signals of two sensors (the first sensor and the second sensor) for detecting the print medium P in an image forming process and may stop printing and may output a print error signal according to the detected feeding state of the print medium P.

Figure 3:
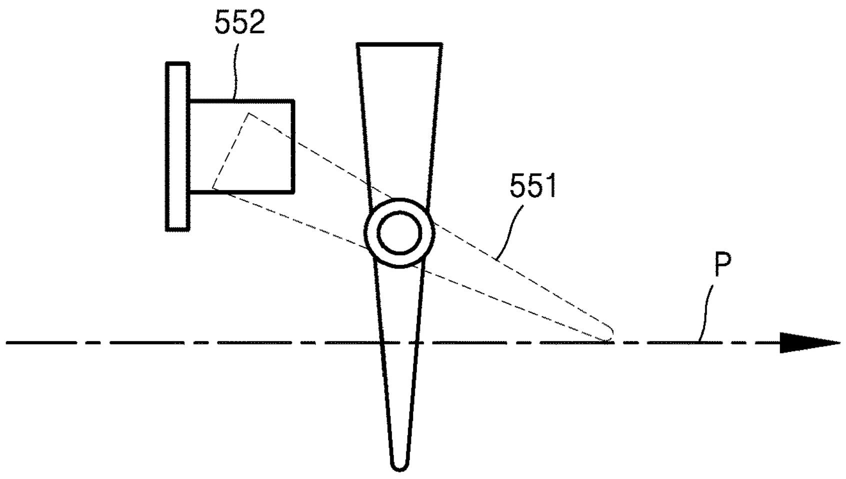
FIG. 3 is a view of a sensor according to an example.

FIG. 3 is a view of a sensor according to an example. Referring to FIG. 3, the sensor may include an actuator 551 that contacts the print medium P and is rotated, and a sensing unit 552 that is turned on/off by the actuator 551. The sensing unit 552 may be a photointerrupter including, for example, a light emitter and a light receiver. For example, when the print medium P is not detected, the actuator 551 is located on a position indicated by a solid line of FIG. 3, light emitted from the light emitter is received by the light receiver, and the sensing unit 552 is turned off. When the print medium P pushes the actuator 551 and the actuator 551 is pivoted to a position indicated by a dashed line of FIG. 3, the actuator 551 is located between the light emitter and the light receiver, light emitted from the light emitter is blocked by the actuator 551 and is not detected by the light receiver, and the sensing unit 552 is turned on. The sensing unit 552 may be connected to the controller 500 by an electrical unit (not shown). A state of a detection signal of the sensor is an "on state" when the print medium P is detected by the sensor and is an "off state" when the print medium P is not detected.

Figure 4:
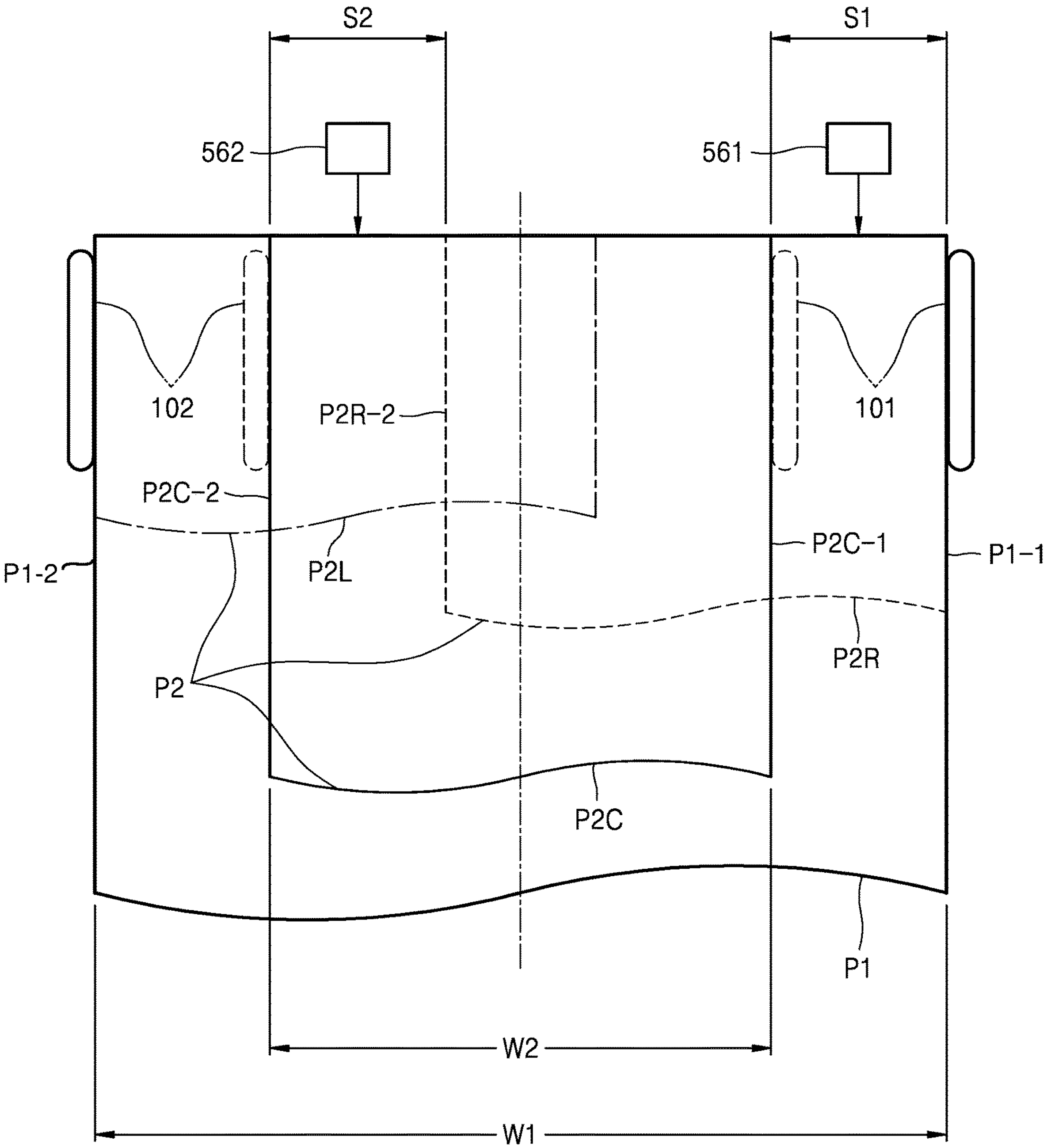
FIG. 4 is a plan view illustrating positions of a first sensor and a second sensor.

FIG. 4 is a plan view illustrating positions of a first sensor and a second sensor. Referring to FIG. 4, the first print medium P1 to which the first mode is applied and the second print medium P2 to which the second mode is applied are illustrated. The second print medium P2 has a width less than a width of the first print medium P1. The second print medium P2 is a print medium having a maximum width to which the second mode is applied.

The first print medium P1 that is center-aligned includes a first end portion P1-1 and a second end portion P1-2 in a width direction. A second print medium P2C that is center-aligned includes a first end portion P2C-1 and a second end portion P2C-2 in the width direction. A first sensor 561 is located to detect the print medium P in a region S1 between the first end portion P1-1 of the first print medium P1 that is center-aligned and the first end portion P2C-1 of the second print medium P2C that is center-aligned. For example, the actuator 551 of the first sensor 561 may be located in the region S1. When the one pair of guide members 101 and 102 are appropriately adjusted as shown in FIG. 2, the second print medium P2 may be loaded as the second print medium P2C on the feeder 100 in a center alignment method as shown in FIG. 4. In this case, the first print medium P1 and the second print medium P2 may be distinguishably detected by the first sensor 561. For example, when a detection signal in an on state is input from the first sensor 561, the controller 500 may recognize that the first print medium P1 is detected. When a detection signal in an on state is not input from the first sensor 561, that is, when a detection signal in an off state is input from the first sensor 561, the controller 500 may recognize that the second print medium P2 is detected. As such, when a feeding state of the print medium P is a normal feeding state, the controller 500 may detect a width of the print medium P and a feeding state of the print medium P according to a detection signal input from the first sensor 561.

A feeding state of the print medium P may be an abnormal feeding state. For example, when the one pair of guide members 101 and 102 are located at positions indicated by a solid line of FIG. 2, the second print medium P2 may be loaded on the feeder 100. The second print medium P2 may be side-aligned as a second print medium P2R with the first end portion P1-1 of the first print medium P1 as shown in FIG. 4, or may be side-aligned as a second print medium P2L with the second end portion P1-2 of the first print medium P1 as shown in FIG. 4. When the second print medium P2 is side-aligned as the second print medium P2L with the second end portion P1-2 of the first print medium P1, since the first sensor 561 is turned off, the controller 500 may distinguishably detect the first print medium P1 and the second print medium P2 based on the detection signal of the first sensor 561. However, when the second print medium P2 is side-aligned as the second print medium P2R with the first end portion P1-1 of the first print medium P1, since a detection signal in an on state is input from the first sensor 561, the controller 500 may not distinguishably detect the first print medium P1 and the second print medium P2 based on the detection signal of the first sensor 561.

In the present example, a second sensor 562 is additionally used. The second sensor 562 is located to detect the print medium P in a region S2 between a second end portion P2R-2 of the second print medium P2 (i.e., the second print medium P2R of FIG. 4) that is side-aligned with the first end portion P1-1 of the first print medium P1 that is center-aligned and the second end portion P2C-2 of the second print medium P2 (i.e., the second print medium P2C of FIG. 4) that is center-aligned. For example, the actuator 551 of the second sensor 562 may be located in the region S2. Since the second sensor 562 is located to detect the print medium P in the region S2, a plurality of sensors that detect the print medium P in an image forming process may perform their own functions and may be each used as the second sensor 562.

The controller 500 may distinguishably detect the first print medium P1 and the second print medium P2 both when the first print medium P1 and the second print medium P2 are loaded on the feeder 100 in a normal feeding state in a center alignment method and when the second print medium P2 is wrongly loaded in a side alignment method by combining detection signals of the first sensor 561 and the second sensor 562. The controller 500 may control the image former 200 by applying one mode selected from among the first mode and the second mode according to a detection result of a width of the print medium P. The controller 500 may stop printing and may output a print error signal according to a detection result of a feeding state of the print medium P. Table 1 shows a type of the print medium P, a combination of detection signals of the first sensor 561 and the second sensor 562, and a print mode.

TABLE 1

| Print medium/feeding state | First sensor | Second sensor | Print mode |
|---|---|---|---|
| First print medium P1 | On | On | First mode |
| Second print medium P2/P2C | Off | On | Second mode |
| Second print medium P2/P2R | On | Off | Print error |
| Second print medium P2/P2L | Off | On | Second mode |

When detection signals in on states are input from both the first sensor 561 and the second sensor 562, the controller 500 may control the image former 200 to perform printing in the first mode. When a detection signal in an off signal is input from the first sensor 561 (in other words, when a detection signal in an on state is not input), the controller 500 may control the image former 200 to perform printing in the second mode. When a detection signal in an on state is input from the first sensor 561 and a detection signal in an off state is input from the second sensor 562 (in other words, when a detection signal in an on state is not input from the second sensor 562), the controller 500 may recognize a feeding error state and may output a print error signal. Accordingly, a user may be guided to check a load state of the print medium P and a feeding state of the print medium P, and unnecessary printing and overheating of the fusing unit 240 may be prevented.

Figure 5:
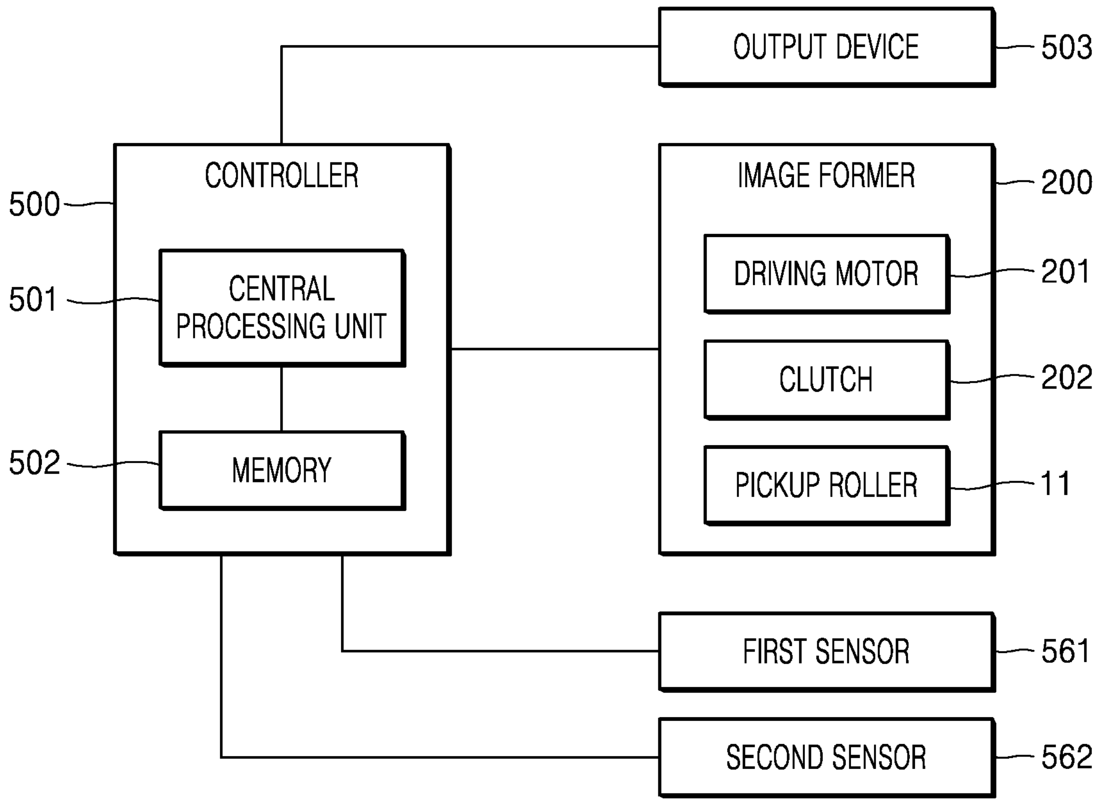
FIG. 5 is a block diagram of a controller according to an example.

FIG. 5 is a block diagram of the controller 500 according to an example. Referring to FIG. 5, the controller 500 may include a central processing unit (CPU) 501 and a memory 502. First and second control factors respectively corresponding to the first mode and the second mode may be stored in the memory 502. The controller 500 may select one mode from among the first and second modes by combining detection signals of the first and second sensors 561 and 562, and may control the image former 200 by reading a corresponding control factor from among the first and second control factors from the memory 502. For example, when a processor speed is controlled according to a print mode, the control factor may be a driving speed of a driving motor 201 that drives rotating members of the image former 200. For example, when an interval between printing operations is controlled according to a print mode, the control factor may be, for example, an operation interval of a clutch 202 that controls driving of the pickup roller 11.

The image forming apparatus may include a plurality of sensors that detect the print medium P conveyed along the print path 400. In the present example, an additional sensor for detecting a width of the print medium P is not used. The controller 500 detects a width of the print medium P by combining detection signals of two sensors from among the plurality of sensors, and controls the image former 200 to perform printing in one mode selected from among the first mode and the second mode whose print speed is less than that of the first mode according to the detected width of the print medium P. Also, the controller 500 may detect a feeding state of the print medium P by combining detection signals of two sensors from among the plurality of sensors, and may stop printing and may output a print error signal according to the detected feeding state of the print medium P. In this configuration, since an additional sensor for detecting a width and a feeding state of the print medium P and an electrical wiring for transmitting a signal of the addition sensor to the controller 500 may be omitted, component costs may be reduced. Also, the image forming apparatus may be made compact.

For example, the plurality of sensors may include a load detection sensor (e.g., a paper empty sensor) 510 configured to detect whether the print medium P is loaded on the feeder 100, an alignment sensor (e.g., a registration sensor) 520 configured to provide a reference position of the print medium P supplied to the image former 200, a paper jam sensor 530 located at an outlet of the fusing unit 240 and configured to detect a jam on the fusing unit 240, and an overload detection sensor 540 provided on the discharger 300 and configured to detect an overload of the discharger 300.

Each of the load detection sensor 510, the alignment sensor 520, paper jam sensor 530, and the overload detection sensor 540 may have, for example, a structure as shown in FIG. 3. The load detection sensor 510 is located at a position indicated by a solid line of FIG. 3 when the print medium P is not loaded on the feeder 10, and a detection signal is maintained in an off state. The alignment sensor 520 may be located at an inlet of the conveying roller 13. When the print medium P is detected by the alignment sensor 520, the controller 500 recognizes that a front end of the print medium P passes through the alignment sensor 520. Accordingly, a reference position of the print medium P may be provided. The controller 500 may control an exposure start time of the exposure unit 220 so that a front end of a toner image formed on the photosensitive drum 21 reaches a transfer nip at a time when the front end of the print medium P reaches the transfer nip where the photosensitive drum 21 and the transfer roller 230 face each other. The paper jam sensor 530 is turned on as indicated by a dashed line of FIG. 3 when the print medium P passes. If the paper jam sensor 530 is not turned off even after a predetermined period of time elapses after the paper jam sensor 530 is turned on, the controller 500 may recognize that a jam occurs on the fusing unit 240. The overload detection sensor 540 is turned on as indicated by a dashed line of FIG. 3 by the print medium P discharged to the discharger 300, and then is turned off as indicated by a solid line of FIG. 3 after discharging is completed. When the overload detection sensor 540 is not turned off and is maintained in an on state, the controller 500 may recognize that the amount of the print medium P loaded on the discharger 300 exceeds a load capacity.

The first sensor 561 may be the overload detection sensor 540. The overload detection sensor 540 is located to detect the print medium P discharged in the region S1 of FIG. 4 in a width direction.

The second sensor 562 may be selected from among sensors that are provided in the feeder 100 and in the print path 400 between the feeder 100 and the discharger 300 and detect the print medium P. Although the load detection sensor 510, the alignment sensor 520, and the paper jam sensor 530 are illustrated in FIG. 1, an additional sensor may be further located between the pickup roller 11 and the conveying roller 13. In the present example, any one of the load detection sensor 510, the alignment sensor 520, and the paper jam sensor 530 is used as the second sensor 562. Any one of the load detection sensor 510, the alignment sensor 520, and the paper jam sensor 530 is located to detect the print medium P in the region S2 of FIG. 4 in the width direction. Since the second sensor 562 is located to detect the print medium P in the region S2, the plurality of sensors, for example, the load detection sensor 510, the alignment sensor 520, and the paper jam sensor 530, may be used as the second sensor 562. Since the load detection sensor 510, the alignment sensor 520, and the paper jam sensor 530 are located in the region S2, the sensors may perform their own functions and may also perform a function of the second sensor 562 that detects a width and a feeding state of the print medium P.

The controller 500 may control the image former 200 to perform printing in one mode from among the first mode and the second mode by combining detection signals of any one of the load detection sensor 510, the alignment sensor 520, and the paper jam sensor 530 functioning as the second sensor 562 and the overload detection sensor 540 functioning as the first sensor 561 as shown in Table 1. Also, the controller 500 may stop the printing and may output a print error signal according to a combination result of the detection signals. Accordingly, without employing an additional sensor that detects a width of the print medium P, the controller 500 may distinguishably recognize the first print medium P1 and the second print medium P2 (e.g., the second print medium P2C, P2L, or P2R of FIG. 4), and may control the image former 200 to print an image in the first mode for the first print medium P1 and in the second mode for the second print medium P2. Also, when the second print medium P2 is fed as the second print medium P2R, a print error signal may be output.

Actually, an image is successfully printed on the first print medium P1 and the second print medium P2 loaded as the second print medium P2C, and an image is not successfully printed on the second print medium P2 loaded as the second print medium P2L or the second print medium P2R. That is, only a part of an image to be printed is printed on the second print medium P2 loaded as the second print medium P2L or the second print medium P2R. When a distance between a user and the image forming apparatus is large, for example, when the image forming apparatus is a network printer, the user may not know a load state of the print medium P on the feeder 100. However, since the second mode may be applied to the second print medium P2L or the second print medium P2R that is inappropriately loaded on the feeder 100 as well as the second print medium P2 that is appropriately loaded on the feeder 100 as the second print medium P2C, in particular, overheating of the fusing unit 240 may be effectively prevented when a plurality of pieces are continuously printed as the second print medium P2. Also, since a print error signal is output when the second print medium P2 is fed as the second print medium P2R, unnecessary printing and overheating of the fusing unit 240 may be prevented.

When a state of a detection signal of the load detection sensor 510 is an off state in an image forming process, it means that the print medium P is not loaded on the feeder 100, the print medium P loaded on the feeder 100 has been completely used, or the second print medium P2 is loaded as the second print medium P2R. Since normal printing may not be performed in any of the above cases, the controller 500 may stop printing and may output a print error signal. Accordingly, the user may be guided to check a load state of the print medium P. Also, since an image is not appropriately printed on the second print medium P2 loaded as the second print medium P2R, unnecessary printing may be prevented. A print error signal may be output through an output device 503 (see FIG. 5). The output device 503 may be, for example, a buzzer, a display, a lamp, or the user's host device.

When a detection signal of the alignment sensor 520 is not changed from an off state to an on state in an image forming process, it means that conveyance failure occurs in the print path 400 from the feeder 100 to the alignment sensor 520 or the second print medium P2 is loaded as the second print medium P2R. Assuming that the alignment sensor 520 is used as the second sensor 562, when a detection signal of the alignment sensor 520 is not changed from an off state to an on state, the controller 500 may drive the image forming apparatus for a time long enough for the print medium P to reach the discharger 300 and may check whether a detection signal in an on state is input from the overload detection sensor 540 during the driving time. When a detection signal in an on state is input from the overload detection sensor 540, it means that the second print medium P2 is loaded on the feeder 100 as the second print medium P2R. Since an image is not appropriately printed on the second print medium P2 loaded as the second print medium P2R, the controller 500 may stop printing and may output a print error signal. When a detection signal in an on state is not input from the overload detection sensor 540, it means that conveyance failure occurs. Accordingly, the controller 500 may stop printing and may output a print error signal. The print error signal may be output through the output device 503 (see FIG. 5). The output device 503 may be, for example, a buzzer, a display, a lamp, or the user's host device.

When a detection signal of the paper jam sensor 530 is not changed from an off state to an on state in an image forming process, it means that conveyance failure occurs in the print path 400 from the feeder 100 to the fusing unit 240, or the second print medium P2 is loaded as the second print medium P2R. Assuming that the paper jam sensor 530 is used as the second sensor 562, when a detection signal of the paper jam sensor 530 is not changed from an off state to an on state, the controller 500 may drive the image forming apparatus for a time long enough for the print medium P to reach the discharger 300, and may check whether a detection signal in an on state is input from the overload detection sensor 540 during the driving time. When a detection signal in an on state is input from the overload detection sensor 540, it means that the second print medium P2 is loaded as the second print medium P2R. Since an image is not appropriately printed on the second print medium P2 loaded as the second print medium P2R, the controller 500 may stop printing and may output a print error signal. When a detection signal in an on state is not input from the overload detection sensor 540, it means that conveyance failure occurs. Accordingly, the controller 500 may stop printing and may output a print error signal. The print error signal may be output through the output device 503 (see FIG. 5). The output device 503 may be, for example, a buzzer, a display, a lamp, or the user's host device.

While examples have been described with reference to the figures, it will be understood by one of ordinary skill in the art that various changes in form and details may be made therein without departing from the spirit and scope as defined by the following claims.

What is claimed is:

1. An image forming apparatus comprising:

a feeder on which a print medium is loadable in a center alignment method;

an image former to print an image by using an electrophotographic method on the print medium supplied from the feeder;

a discharger on which the print medium having the image printed thereon is dischargeable;

a first sensor located to detect an overload of the discharger;

a second sensor located between the feeder and the discharger to detect the print medium;

a controller to, identify a width of the print medium based on the first and the second sensor and control the image former to perform printing by applying different print modes according to the width of the print medium.

2. The image forming apparatus of claim 1, wherein the different print modes comprise a first mode and a second mode, the second mode corresponding to a second print speed less than a first print speed corresponding to the first mode.

3. The image forming apparatus of claim 2, wherein the print medium is one of a first print medium having a first width to which the first mode is to be applied, or a second print medium having a second width less than the first width of the first print medium and a maximum width, to which the second mode is to be applied, wherein, the first sensor detects the print medium between a first end portion in a width direction of the first print medium that is center-aligned and a first end portion in a width direction of the second print medium that is center-aligned, and the second sensor detects the print medium between a second end portion in the width direction of the second print medium that is side-aligned with the first end portion in the width direction of the first print medium and a second end portion in the width direction of the second print medium that is center-aligned.

4. The image forming apparatus of claim 3, wherein the controller is further to detect a feeding state of the print medium according to a combination of the feeder load state of the second sensor and the overload state of the first sensor, and stop the printing and output a print error signal according to the detected feeding state of the print medium.

5. The image forming apparatus of claim 4, wherein, the feeder load and overload states include on or off states, and when the feeder load and overload states in on states are input from both the first sensor and the second sensor, the controller is to control the image former to perform the printing in the first mode.

6. The image forming apparatus of claim 4, wherein, the overload state includes an on or off state, and when the overload state in an off state is input from the first sensor, the controller is to control the image former to perform the printing in the second mode.

7. The image forming apparatus of claim 4, wherein, the feeder load state includes an on or off state, and when the feeder load state in an off state is input from the first sensor, the controller is to stop the printing and output the print error signal.

8. The image forming apparatus of any of claim 2, wherein the controller is to control the image former to print the image at the first print speed in the first mode, and control the image former to print the image at the second print speed less than the first print speed in the second mode.

9. The image forming apparatus of claim 2, wherein the controller is to set an interval between printing operations during continuous printing as a first interval in the first mode and a second interval greater than the first interval in the second mode.

10. An image forming apparatus comprising:

a feeder on which a print medium is loadable;

an image former to print an image on the print medium by using an electrophotographic method;

a discharger on which the print medium having the image printed thereon is dischargeable;

a plurality of sensors located in a print path from the feeder to the discharger, each sensor of the plurality of sensors to detect the print medium; and a controller to identify a width of the print medium according to a combination of a state of a first detection signal of a first sensor among the plurality of sensors and a state of a second detection signal of a second sensor among the plurality of sensors, and control the image former to perform printing according to a mode selected from among a first mode and a second mode, the second mode having a second print speed less than a first print speed of the first mode, according to the identified width of the print medium, wherein the print medium is one of a first print medium having a first width, to which the first mode is to be applied, or a second print medium having a second width less than the first width of the first print medium and a maximum width, to which the second mode is to be applied, wherein, the state of the first detection signal is input from the first sensor based on the first sensor detecting the print medium between a first end portion in a width direction of the first print medium that is center-aligned and a first end portion in a width direction of the second print medium that is center-aligned; and the state of the second detection signal is input from the second sensor based on the second sensor detecting the print medium between a second end portion in the width direction of the second print medium that is side-aligned with the first end portion in the width direction of the first print medium and a second end portion of the second print medium that is center-aligned.

11. The image forming apparatus of claim 10, wherein, the state of the first detection signal and the state of the second detection signal respectively include on or off states, and when the state of the first detection signal and the state of the second detection signal in on states are input from both the first sensor and the second sensor, the controller is to control the image former to perform the printing in the first mode.

12. The image forming apparatus of claim 11, wherein, the state of the first detection signal includes an on or off state of the first sensor, and when the state of the first detection signal in an off state is input from the first sensor, the controller is to control the image former to perform the printing in the second mode.

13. The image forming apparatus of claim 11, wherein the first sensor is located to detect an overload of the discharger, and the second sensor is any one sensor from among a load detection sensor located on the feeder and to detect whether the print medium is loaded on the feeder, an alignment sensor to provide a reference position of the print medium supplied to the image former, or a paper jam sensor located at an outlet of a fusing unit and to detect a jam on the fusing unit.

14. The image forming apparatus of claim 13, wherein, the second sensor is the load detection sensor, the state of the second detection signal of the second sensor is a feeder load state of a feeder load detection signal of the load detection sensor, the feeder load state of the feeder load detection signal includes an on or off state, and when the feeder load state of the feeder load detection signal in an off state is input from the load detection sensor, the controller is to stop the printing and output a print error signal.

15. The image forming apparatus of claim 13, wherein, the state of the second detection signal of the second sensor includes an on or off state, the second sensor is any one from among the alignment sensor or the paper jam sensor, and when the state of the second detection signal in an off state is input from the second sensor and the state of the first detection signal in an on state is not input from the first sensor, the controller is to output a print error signal through an output device.

* * * * *